United States Patent [19]

Kinoshita

[11] Patent Number: 4,700,314
[45] Date of Patent: Oct. 13, 1987

[54] TAPER CUTTING METHOD

[75] Inventor: Mitsuo Kinoshita, Hachioji, Japan

[73] Assignee: Fanuc Ltd., Minamitsuru, Japan

[21] Appl. No.: 711,580

[22] PCT Filed: Jul. 6, 1984

[86] PCT No.: PCT/JP84/00346
§ 371 Date: Mar. 6, 1985
§ 102(e) Date: Mar. 6, 1985

[87] PCT Pub. No.: WO85/00310
PCT Pub. Date: Jan. 31, 1985

[30] Foreign Application Priority Data

Jul. 7, 1983 [JP] Japan ................. 58-123601

[51] Int. Cl.$^4$ ........................... B23H 1/02
[52] U.S. Cl. ...................... 364/475; 219/69 M;
219/69 W; 364/168
[58] Field of Search ............... 364/167–169,
364/191–194, 474, 475; 318/568, 569, 570, 573,
574; 219/69 W, 69 M, 69 C

[56] References Cited

U.S. PATENT DOCUMENTS

| 3,581,045 | 5/1971 | Panschow | 219/69 G |
| 3,731,044 | 5/1973 | Ullmann et al. | 219/69 V |
| 3,731,045 | 5/1973 | Ullmann et al. | 219/69 V |
| 3,849,624 | 11/1974 | Dulebohn et al. | 219/69 V |
| 3,946,189 | 3/1976 | Pomella et al. | 219/69 E |
| 4,123,645 | 10/1978 | Shichida et al. | 219/69 W |
| 4,314,133 | 2/1982 | Pfau et al. | 219/69 M |
| 4,333,806 | 6/1982 | Inoue | 204/129.1 |
| 4,355,223 | 10/1982 | Inoue et al. | 219/69 W |
| 4,363,948 | 12/1982 | Itoh | 219/69 W |
| 4,467,166 | 8/1984 | Gamo, II et al. | 219/69 M |

FOREIGN PATENT DOCUMENTS

| 55-77424 | 6/1980 | Japan . | |
| 55-120930 | 9/1980 | Japan . | |
| 0066823 | 4/1982 | Japan | 219/69 M |
| 0114822 | 7/1983 | Japan | 219/69 M |
| 0161236 | 9/1984 | Japan | 219/69 M |
| 82/01147 | 4/1982 | PCT Int'l Appl. | 219/69 M |

OTHER PUBLICATIONS

International Search Report, PCT/JP81/00271.

Primary Examiner—Jerry Smith
Assistant Examiner—Clark A. Jablon
Attorney, Agent, or Firm—Staas & Halsey

[57] ABSTRACT

A taper cutting method for inserting a cut surface having a frustoconical shape between first and second taper-cut surfaces is adapted to cut a corner contour in which first and second circular arcs are smoothly connected to respective wire paths on upper and lower workpiece surfaces of a first tapered surface, and in which there is a smooth connection from end points of the first and second circular arcs to respective wire paths on the upper and lower workpiece surfaces of a second tapered surface.

4 Claims, 11 Drawing Figures

TAPER CUTTING METHOD

BACKGROUND OF THE INVENTION

This invention relates to a taper cutting method and, more particularly, to a taper cutting method for inserting a cut surface having a frustoconical shape between first and second taper-cut surfaces.

As is well-known in the art, a wire-cut electric discharge machine has a wire stretched between an upper guied and a lower guide and machines a workpiece by producing an electrical discharge between the wire and the workpiece. The workpiece, secured to a table, is transported in X and Y directions along a machining contour in response to commands from a numerical control apparatus. When the wire is tensioned normal to the table (workpiece), the upper and lower surfaces of the workpiece will be machined into contours which are identical. If the arrangement is such that the upper guide can be displaced in the X and Y directions (referred to as the U and V axes) to incline the wire with respect to the workpiece as by displacing the upper guide in a direction at right angles to the direction of workpiece movement, then the upper and lower surfaces of the workpiece will not be machined to the same contour, and the surface cut by the wire will be inclined. This is so-called taper cutting.

FIG. 1 is a view for explaining such taper cutting, in which a wire is stretched between an upper guide UG and a lower guide DG at a predetermined angle of inclination with respect to a workpiece WK. If we take the lower surface PL of the workpiece WK as the programmed contour (the upper surface QU of the workpiece WK may also serve as a programmmed contour), and if we let α denote the taper angle, H the distance between the upper guide UG and the lower guide DG, and h the distance from the lower guide DG to the lower surface of the workpiece WK, then the offset $d_1$ of the lower guide DG and the offset $d_2$ of the upper guide UG with respect to the lower surface PL of the workpiece, may be expressed as follows:

$$d_1 = h \cdot \tan\alpha + \frac{d}{2} \quad (1)$$

$$d_2 = H \cdot \tan\alpha - h \tan\alpha - \frac{d}{2} \quad (2)$$

$$= H \cdot \tan\alpha - d_1$$

Note that d is the cut width.

Accordingly, if the movement of the upper guide UG between which the wire WR is stretched is so controlled in relation to workpiece movement that the offsets $d_1$, $d_2$ remain constant, then taper cutting at the taper angle can be carried out, as shown in FIG. 2. The dashed line and one-dot chain line in the Figure indicate the paths of the upper and lower guides UG, DG, respectively.

In performing taper cutting with such a wire-cut electric discharge machine, a programmed path on the upper or lower surface of the workpiece, feedrate on the programmed path, taper angle α and distances H, h, etc., are commanded as set forth above and cutting is carried out in the manner commanded.

Thus, in a wire-cut electric discharge machine, taper cutting can be performed through comparatively simple control if the taper angle α is constant.

With the above-described conventional method, however, corner cutting for providing a corner portion with any desired degree of roundness cannot be carried out in simple fashion and a corner having any radius cannot be cut at the upper and lower surfaces of the workpiece.

SUMMARY OF THE INVENTION

An object of the present invention is to provide a taper cutting method whereby first and second circular arcs having any radius can be inserted at the upper and lower surfaces of a workpiece at a corner portion, respectively.

Another object of the present invention is to provide a taper cutting method whereby there can be obtained a corner contour in which first and second circular arcs are smoothly connected to respective wire paths on upper and lower workpiece surfaces of a first tapered surface, and in which there is a smooth connection from the end points of the first and second circular arcs to the respective wire paths on the upper and lower workpiece surfaces of a second tapered surface.

A further object of the present invention is to provide a taper cutting method for broadening the scope of application of a wire-cut electric discharge machine.

According to the present invention, the foregoing objects are attained by providing a taper cutting method for a corner contour in which first and second circular arcs are smoothly connected to respective wire paths on upper and lower workpiece surfaces of a first tapered surface, and in which there is a smooth connection from the end points of the first and second circular arcs to the respective wire paths on the upper and lower workpiece surfaces of a second tapered surface, characterized by entering radii r, s of circular arcs on the upper and lower workpiece surfaces, respectively, together with path data; calculating coordinates of points Q, R at which the circular arc having the radius r contacts a path of first and second tapered surfaces on the upper workpiece surface, and of a center O of the circular arc; calculating coordinates of points Q', R' at which the circular arc having the radius s contacts a path of the first and second tapered surfaces on the lower workpiece surface, and of a center O' of the circular arc; calculating, through use of the coordinates of the contact points Q, R, Q', R', end point offset vectors from the point Q or Q' on a programmed path of the first tapered surface to an upper guide and a lower guide, and starting point offset vectors from the point R or R' on a programmed path of the second tapered surface to a lower guide and an upper guide, and, through use of the offset vectors, first cutting the first tapered surface, then cutting a frustoconical corner by moving a wire along the circular arc of radius r and the circular arc of radius s on the upper and lower workpiece surfaces, and thereafter cutting the second tapered surface.

With a taper cutting method of this kind, the present invention makes it possible to insert a circular arc having any radius at the upper and lower surfaces of a workpiece at the corner portion thereof, and to insert the arcs so as to contact first and second tapered surfaces, thereby enhancing the wire-cut function.

DESCRIPTION OF PREFERRED EMBODIMENT

An embodiment of the present invention will now be described in detail with reference to the drawings.

Figure 1:
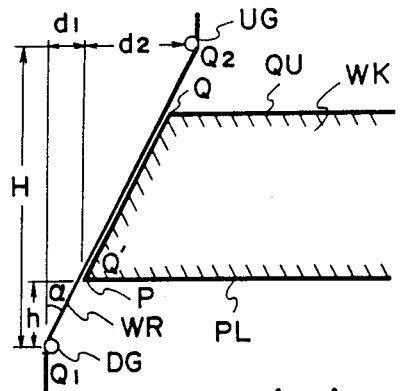
FIG. 1 is a view for describing taper cutting.
Figure 2:
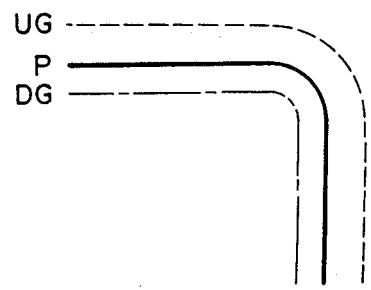
FIG. 2 is a view for describing an upper guide path and a lower guide path which are the result of relative movement.
Figure 3A:
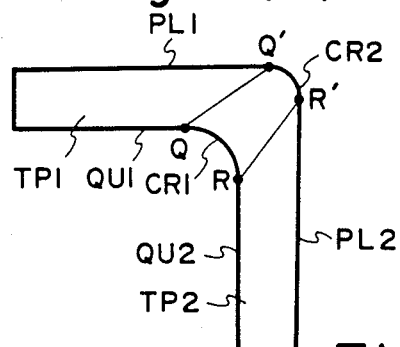
FIGS. 3(A) through 3(C) are views for describing a taper cutting method according to the present invention.
Figure 3B:
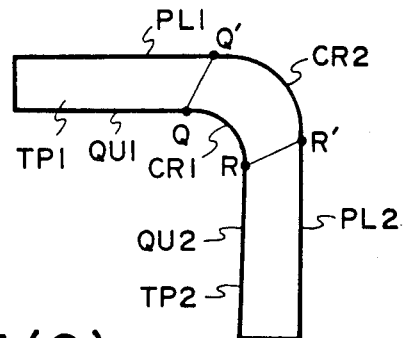
Figure 3C:
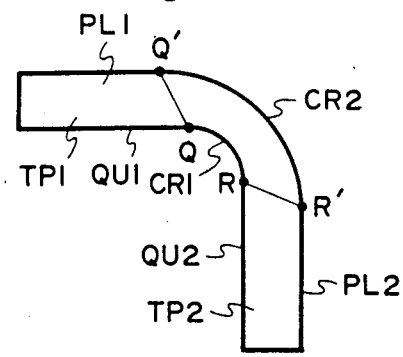

FIGS. 3(A) through (C) are views for describing a taper cutting method according to the present invention. First and second circular arcs $CR_1$, $CR_2$ are smoothly connected to respective wire paths $QU_1$, $PL_1$ on upper and lower workpiece surfaces of a first tapered surface $TP_1$, and there is a smooth connection from end points R, R' of the respective first and second circular arcs to wire paths $QU_2$, $PL_2$ on the upper and lower workpiece surfaces of a second tapered surface $TP_2$, respectively. FIG. 3(A) shows an example for a case where the radius r of the circular arc $CR_1$ on the upper surface of the workpiece is greater than the radius s of the circular arc $CR_2$ on the lower surface of the workpiece. In FIGS. 3(B) and (C), $r<s$ holds.

Figure 4:
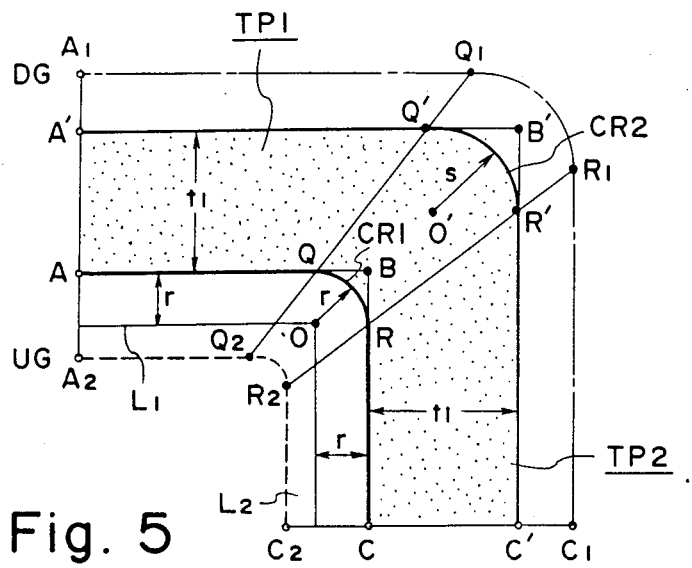
FIG. 4 is an explanatory view for describing the taper cutting method of the present invention in greater detail.

FIG. 4 is an explanatory view for describing the taper cutting method of the present invention in greater detail. In the figure, the heavier solid line indicated the programmed contour of the upper surface of the workpiece, the dashed line shows the path of the upper guide UG, and the one-dot chain line indicates the path of the lower guide DG. In cutting a taper of a typical shape where the two tapered surfaces $TP_1$, $TP_2$ intersect at an angle at a corner portion, program path data for the first and second tapered surfaces $TP_1$, $TP_2$ of the upper surface of the workpiece are given in addition to the vertical distance H between the upper and lower guides UG, DG, the vertical distance h from the upper surface of the workpiece to the lower guide, and first and second taper angles $\alpha_1$, $\alpha_2$. Let $(x_1, y_1)$, $(x_2, y_2)$ represent incremental values indicative of the path on the first and second tapered surfaces $TP_1$, $TP_2$, respectively. The following command will then be issued from a paper tape:

$$G01\ X\ x_1\ Y\ y_1; \tag{3}$$

$$X\ x_2\ Y\ y_2;$$

Note that G01 signifies linear interpolation. The symbol ";" stands for the end of a block.

Let us now consider a case in which the corner where the first and second tapered surfaces $TP_1$, $TP_2$ meet is to be cut to a taper having a frustoconical shape, namely a case for cutting a corner contour in which the first circular arc $CR_1$ of radius r and the second circular arc $CR_2$ of radius s are smoothly connected to the wire path AQ on the upper workpiece piece and to the wire path A'Q' on the lower workpiece surface, respectively, of the first tapered surface $TP_1$, and in which there is a smooth connection from the end points of the first and second circular arcs to the respective wire paths RC and R'C' on the upper and lower workpiece surfaces of the second tapered surface $TP_2$. In such case, the following command will be issued from the input medium such as the paper tape, and processing set forth below will be carried out:

$$G\ 01\ X\ x_1\ Y\ y_1\ R_r\ S_s\ Z_z; \tag{4}$$

$$X\ x_2\ Y\ y_2;$$

The letters of the alphabet R, S, Z are address words for commanding the radius r of the upper surface of the workpiece, the radius s of the lower surface of the workpiece, and the workpiece thickness z, respectively. The first and second tapered surfaces $TP_1$, $TP_2$ have the same taper angle $\alpha$, which is assumed to be given in a previous block.

More specifically, when the data indicated by (4) above have been entered, the coordinates of the points Q, R are found. These are points where the first circular arc $CR_1$ of radius r contacts the respective line segments AB, AC from the inner side thereof. The coordinates of the center O of circular arc $CR_1$ are found as the coordinates of the point of intersection between a straight line parallel to the line segment AB and spaced therefrom by a distance r, and a straight line parallel to the line segment BC and similarly spaced therefrom by the distance r.

A line segment A'B' indicative of the path on the lower surface of the workpiece is a straight line parallel to the line segment AB and spaced therefrom by an offset $t_1$ found from the following:

$$t_1 = z \cdot \tan\alpha \tag{5}$$

where z is the workpiece thickness and $\alpha$ is the taper angle. Likewise, a line segment B'C' indicative of the path on the lower surface of the workpiece is a straight line parallel to the line segment BC and spaced therefrom by the offset $t_1$ found from Eq. (5).

When the line segments A'B', B'C' have been found, the coordinates of points Q', R', where the second circular arc $CR_2$ of radius s internally contacts these two line segments, as well as the coordinates of the center O', are found just as set forth above for the upper surface of the workpiece.

Next, let $Q_1$, $Q_2$ represent the points where the extension of the straight line QQ' intersects the paths of the lower and upper guides DG, UG, rspectively, and let $R_1$, $R_2$ represent the points where the extension of the straight line RR' intersects the paths of the lower and upper guides DG, UG, respectively. Offset vectors $QQ_1$, $QQ_2$, $RR_1$, $RR_2$ are now found. These offset vectors are obtained from the following equations:

$$QQ_1 = h/Z \cdot QQ' \tag{6}$$

-continued $$QQ_2 = (h - H)/Z \cdot \overrightarrow{QQ'} \quad (7)$$

$$RR_1 = h/Z \cdot \overrightarrow{RR'} \quad (8)$$

$$RR_2 = (h - H)/Z \cdot \overrightarrow{RR'} \quad (9)$$

In eqs. (6) through (9), Z represents workpiece thickness, H the vertical distance between the upper and lower guides, and h the vertical distance from the upper surface of the workpiece to the lower guide.

When the offset vectors $QQ_1$, $QQ_2$, $RR_1$, $RR_2$ have been found through the foregoing processing, the first tapered surface $TP_1$ is cut in accordance with a method described below. Specifically, a workpiece travelling distance vector $VT_1$ and an upper guide travelling distance vector $VG_1$ are found by a method described below using starting point offset vectors $AA_1$, $AA_2$ and end point offset vectors $QQ_1$, $QQ_2$ of the first tapered surface. Workpiece drive motors are driven by X- and Y-axis components ($\Delta X_1$, $\Delta Y_1$) of the workpiece travelling distance vector $VT_1$, and upper guide drive motors are driven by U- and V-axis components ($\Delta U_1$, $\Delta V_1$) of the upper guide travelling distance vector $VG_1$. This completes cutting of the first tapered surface $TP_1$.

Next, relative movement between a wire electrode and the workpiece is so controlled that a cutting trajectory on the upper surface of the workpiece traverses a circular arc QR, and so that a cutting trajectory on the lower surface of the workpiece traverses a circular arc Q'R', thereby to taper-cut a corner into a frustoconical contour.

When the frustoconical corner taper cutting operation is completed, the second tapered surface $TP_2$ is cut. Specifically, a workpiece travelling distance vector $VT_2$ and a guide vector $VG_2$ are found by using starting point offset vectors $RR_1$, $RR_2$ and end point offset vectors $CC_1$, $CC_2$ of the second tapered surface, and the workpiece and upper guide are moved using $VT_2$, $VG_2$, just as described in connection with the first tapered surface $TP_1$. The second tapered surface $TP_2$ will thus be cut.

Let us now describe a method of calculating the travelling distance vectors $VG_i$ of the tapered surfaces $TP_1$, $TP_2$.

Figure 5:
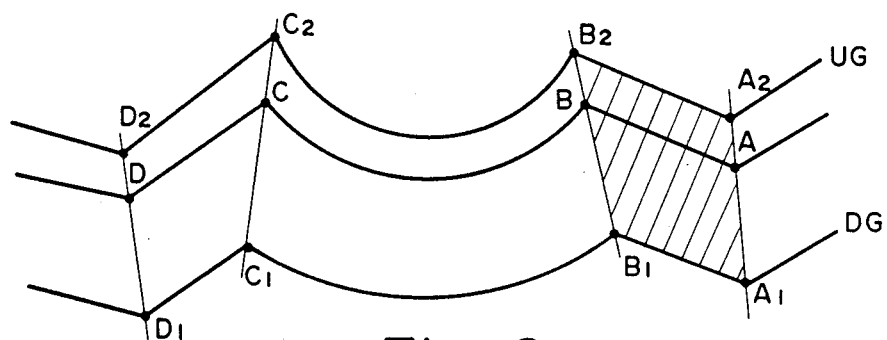
FIG. 5 is a view for describing the paths of the upper and lower guides for a case where the programmed contour comprises a combination of straight lines and circular arcs.
Figure 6:
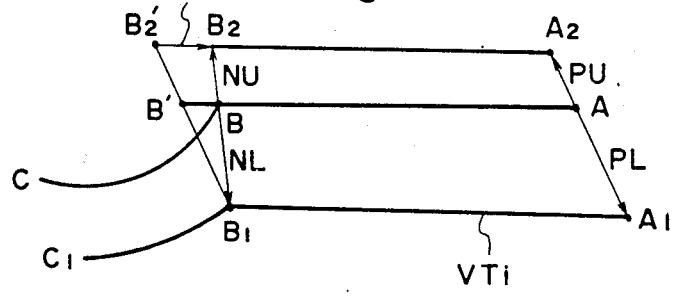
FIG. 6 is a view for describing a method of calculating a workpiece and upper guide travelling distance.

FIG. 5 is a view for describing the paths of the upper and lower guides for a case where the programmed contour is a contour comprising a combination of straight lines and circular arcs (the taper angle is assumed to be constant). FIG. 6 is a view for describing a method of calculating a workpiece travelling distance vector $VT_i$ and the upper guide travelling distance vector $VG_i$.

In FIG. 5, A, B, C and D represent points on the cut contour of the upper workpiece surface (or lower workpiece surface). For the programmed contour $\overline{AB}$ part of the contour consisting of straight lines and circular arcs connecting these points, the path of the upper guide UG is $\overline{A_2B_2}$ and the path of the lower guide DG is $\overline{A_1B_1}$.

Described next in accordance with FIG. 6 will be a method of calculating the workpiece travelling distance vector $VT_i$ and upper guide travelling distance vector $VG_i$ for a case where the tapered surface indicated by the shaded portion in FIG. 5 is cut.

A starting point offset vector PL ($=\overrightarrow{AA_1}$) at the starting point A of the programmed contour (straight line) AB is already known as it is equal to the end point offset vector at the end of the preceding block of the lower guide DG. A starting point offset vector PU ($=\overrightarrow{AA_2}$) is the end point offset vector at the end of the preceding block of the upper guide UG and it, too, is already known.

Accordingly, if end point offset vectors $\overrightarrow{NL}$ ($=\overrightarrow{BB_1}$), $\overrightarrow{NU}$ ($=\overrightarrow{BB_2}$) up to the lower and upper guides at the end point B of the straight line AB are found, then the workpiece travelling distance vector $VT_i$ ($=\overrightarrow{AB} = \overrightarrow{A_1B_1}$) and the upper guide travelling distance vector $VG_i(=\overrightarrow{B_2B'_2})$ can be calculated from the following equations:

$$VT_i = \overrightarrow{AB} + NL - PL \quad (10)$$

$$VG_i = (PU - PL) - (NU - NL) \quad (11)$$

Starting point offset vectors $PU_1$, $PL_1$: $PU_2$, $PL_2$ and end point offset vectors $NU_1$, $NL_1$; $NU_2$, $NL_2$ of the first and second tapered surfaces $TP_1$, $TP_2$ shown in FIG. 4 are as set forth in the table below. Accordingly, $VT_i$, $VG_i$ of the first and second tapered surfaces are found from the Eqs. (10), (11), table drive motors MX, MY are driven by the respective X- and Y-axis components ($\Delta X_i$, $\Delta Y_i$) of the workpiece travelling distance vector $VT_1$, and upper guide drive motors MU, MV are driven by the respective X- and Y-axis components ($\Delta U_i$, $\Delta V_i$) of the upper guide travelling distance vector $VG_i$. When this is done, the first and second tapered surfaces $TP_1$, $TP_2$ shown in FIG. 4 can be cut by electric discharge machining.

|        | 1st TAPERED SURFACE $TP_1$ | 2nd TAPERED SURFACE $TP_2$ |
|--------|----------------------------|----------------------------|
| $PU_1$ | $\overrightarrow{AA_2}$    | $\overrightarrow{RR_2}$    |
| $PL_1$ | $\overrightarrow{AA_1}$    | $\overrightarrow{RR_1}$    |
| $NU_1$ | $\overrightarrow{QQ_2}$    | $\overrightarrow{CC_2}$    |
| $NL_1$ | $\overrightarrow{QQ_1}$    | $\overrightarrow{CC_1}$    |

Figure 7:
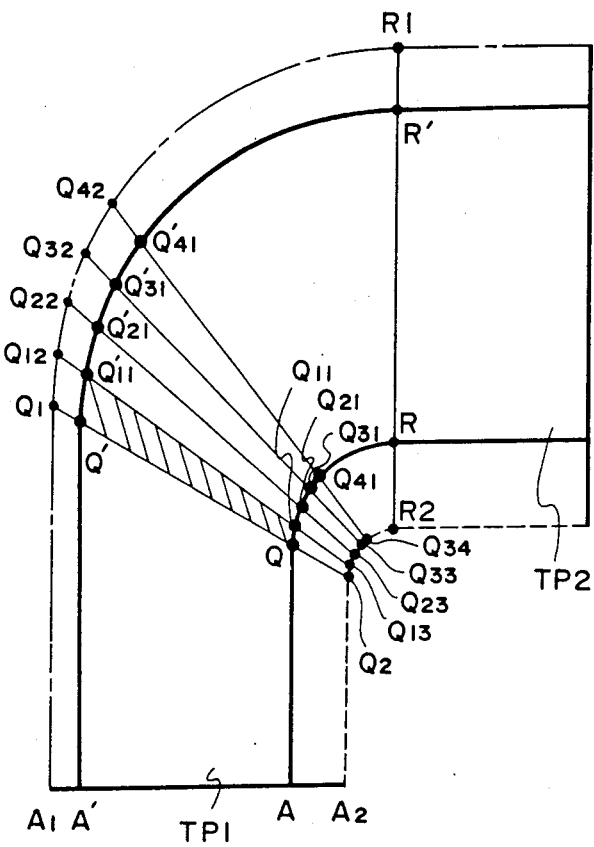
FIG. 7 is a view for describing a taper cutting method of the present invention in which cutting trajectories on the upper and lower surfaces of a workpiece are assumed to be circular arcs having commanded radii r, s, respectively.

FIG. 7 is a view for describing how relative movement between the upper guide and workpiece is controlled so that cutting trajectories on the upper and lower surfaces of the workpiece will traverse circular arcs $\overline{QR}$ (FIG. 4) and $\overline{Q'R'}$ respectively. In cutting a corner having a frustoconical shape, the present invention divides the circular arcs $\overline{QR}$, $Q'R'$, into m equal segments to perform a polygonal approximation thereof, and controls the movement of the workpiece WK and of the upper guide UG in accordance with the method described in conjunction with FIG. 6.

More specifically, the circular arcs $\overline{QR}$, $Q'R'$ are each subjected to a polygonal approximation by being divided into a member m of minute segments. The coordinates of the partitioning points $Q_{11}$, $Q_{21}$, $Q_{31}$... and $Q'_{11}$, $Q'_{21}$, $Q'_{31}$... that result by such division of the circular arcs $\overline{QR}$, $Q'R'$, respectively, can be readily calculated because the points Q, R, O, Q', R', O' and the radii r, s of the circular arcs are already known. Next, on extensions of the lines connecting corresponding partitioning points $Q_{11}$ and $Q'_{11}$, $Q_{21}$ and $Q'_{21}$, $Q_{31}$..., partitioning points $Q_{12}$, $Q_{22}$, $Q_{33}$... are found that satisfy the following equations:

$$nl_1 = \overrightarrow{Q_{12}Q_{11}} = \overrightarrow{Q_{11}Q'_{11}} \cdot h/Z \tag{12}$$

$$nl_2 = \overrightarrow{Q_{21}Q_{22}} = \overrightarrow{Q_{21}Q'_{21}} \cdot h/Z \tag{13}$$

$$nl_3 = \overrightarrow{Q_{31}Q_{32}} = \overrightarrow{Q_{31}Q'_{31}} \cdot h/Z \tag{14}$$

Thereafter, on extensions of the lines connecting corresponding partitioning points $Q_{11}$ and $Q'_{11}$, $Q_{21}$ and $Q'_{21}$, $Q_{31}$ and $Q'_{31}$..., partitioning points $Q_{13}$, $Q_{23}$, $Q_{33}$... are found that satisfy the following equations:

$$nu_1 = \overrightarrow{Q_{11}Q_{13}} \tag{12'}$$
$$= \overrightarrow{Q_{12}Q_{11}} \cdot (h - H)/Z$$

$$nu_2 = \overrightarrow{Q_{21}Q_{23}} \tag{13'}$$
$$= \overrightarrow{Q_{21}Q_{22}} \cdot (h - H)/Z$$

$$nu_3 = \overrightarrow{Q_{31}Q_{33}} \tag{14'}$$
$$= \overrightarrow{Q_{31}Q_{32}} \cdot (h - H)/Z$$

This is followed by regarding the partitioning inteval as a straight line, finding a workpiece travelling distance vector $vt_i$ and a guide travelling vector $vg_i$ by the method described in conjunction with FIG. 6, driving the table drive motors MX, MY by the axis components ($\Delta X_i$, $\Delta Y_i$) of the vector $vt_i$, and driving the upper guide drive motors MU, MV by the axis components ($\Delta U_i$, $\Delta V_i$) of the vector $vg_i$.

Specifically, in cutting the taper indicated by the shaded portion in FIG. 7, offset vectors $\overline{pu_1} = \overrightarrow{QQ_2}$, $pl_1 = \overrightarrow{QQ_1}$ of the polygonal starting point $\overrightarrow{Q}$ and end point offset vectors $nu_1 = \overrightarrow{Q_{11}Q_{13}}$, $nl_1 = \overrightarrow{Q_{11}Q_{12}}$ of the polygonal end point $Q_{11}$ are used so that $vt_1$, $vg_1$ may be found from Eqs. (10), (11):

$$vt_1 = \overrightarrow{QQ_{11}} + nl_1 - pl_1 \tag{15}$$
$$= \overrightarrow{QQ_{11}} + \overrightarrow{Q_{11}Q_{12}} - \overrightarrow{QQ_1}$$

$$vg_1 = (pu_1 - pl_1) - (nu_1 - nl_1) \tag{16}$$
$$= (\overrightarrow{QQ_2} - \overrightarrow{Q_{11}}) - (\overrightarrow{Q_{11}Q_{13}} - \overrightarrow{Q_{11}Q_{12}})$$

If the table WK and upper guide UG are now driven for simultaneous four-axis control, the taper indicated by the shaded portion in FIG. 7 can be cut. If the portion of the polygonal approximation is sucessively taper-cut in similar fashion from this point onward, machining will be carried out to cut a tapered surface such that the cutting trajectories on the upper and lower surfaces of the workpiece will traverse the circular acrs QR, Q'R', respectively. Note that the workpiece travelling distance vector $vt_i$ ($i=1, 2, ...$) and upper guide travelling distance vector $vg_i$ ($i=1, 2, ...$) generally are indicated by the following equations:

$$vt_i = vw_i + nl_i - pl_i \tag{17}$$
$$vg_i = (pu_i - pl_i) - (nu_i - nl_i) \tag{18}$$

where $vw_i = \overrightarrow{Q_{i-1,i}Q_{i,1}}$, $pu_1 = \overrightarrow{QQ_2}$, $pl_1 = \overrightarrow{QQ_1}$, $pu_{i+1} = nu_i$, $pl_{i+1} = nl_i$ ($i = 1, 2, ...$).

Figure 8:
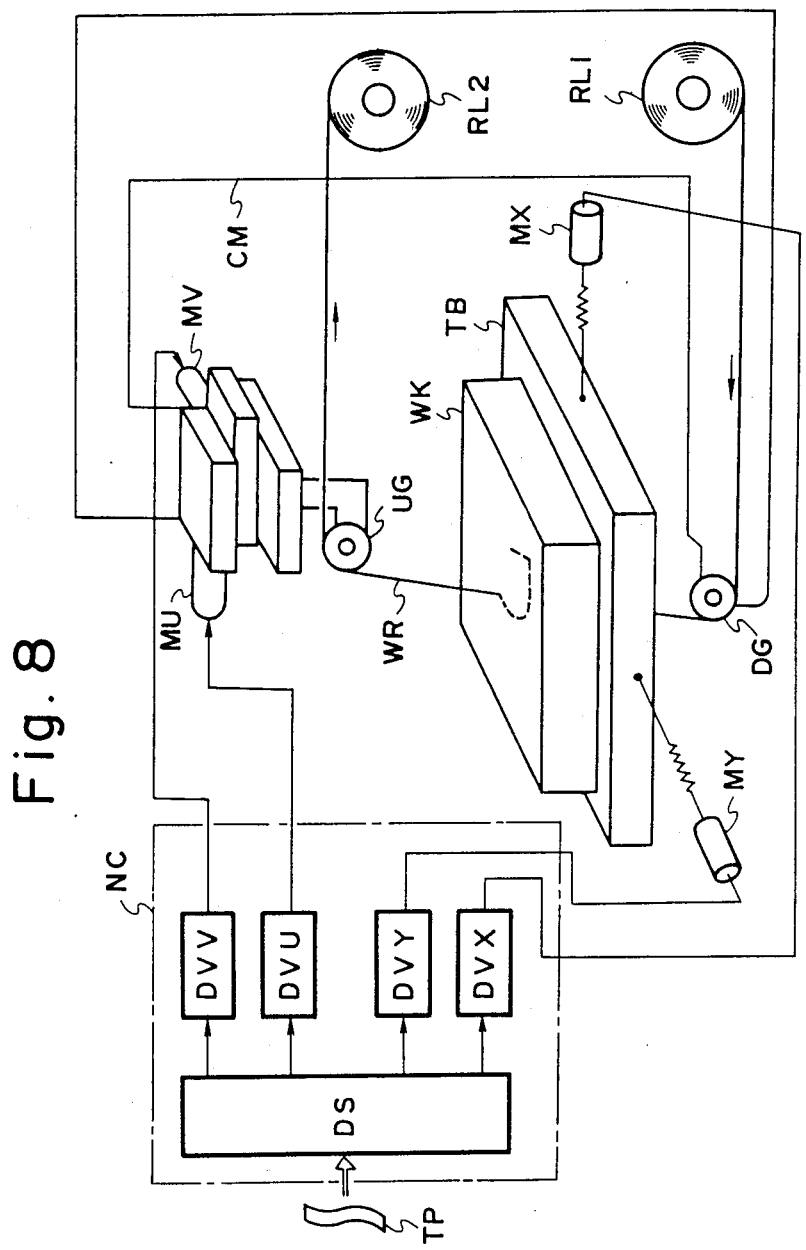
FIG. 8 is a schematic view of a wire-cut electric discharge machine.

FIG. 8 is a view for describing a four-axis control wire-cut electric discharge machine to which the present invention can be applied. A workpiece WK is secured on an X-Y table transported in X and Y directions by motors MX, MY, respectively. A wire WR is taken up by a reel RL2 while being paid out by a reel RL1, and is supplied with a voltage by a contacting electrode, not shown, so that ane lectrical discharge is produced between the wire and the workpiece WK. The upper guide UG is provided on a column CM and is capable of being moved in the X and Y directions by motors MU, MV, respectively. The motors MX, MY, MU, MV are driven by respective drive circuits DVX, DVY, DVU, DVV of a numerical control apparatus NC. It should be noted that when the contents of a tape TP are read, distribution processing is performed along the various axes by a distributing circuit DS.

Figure 9:
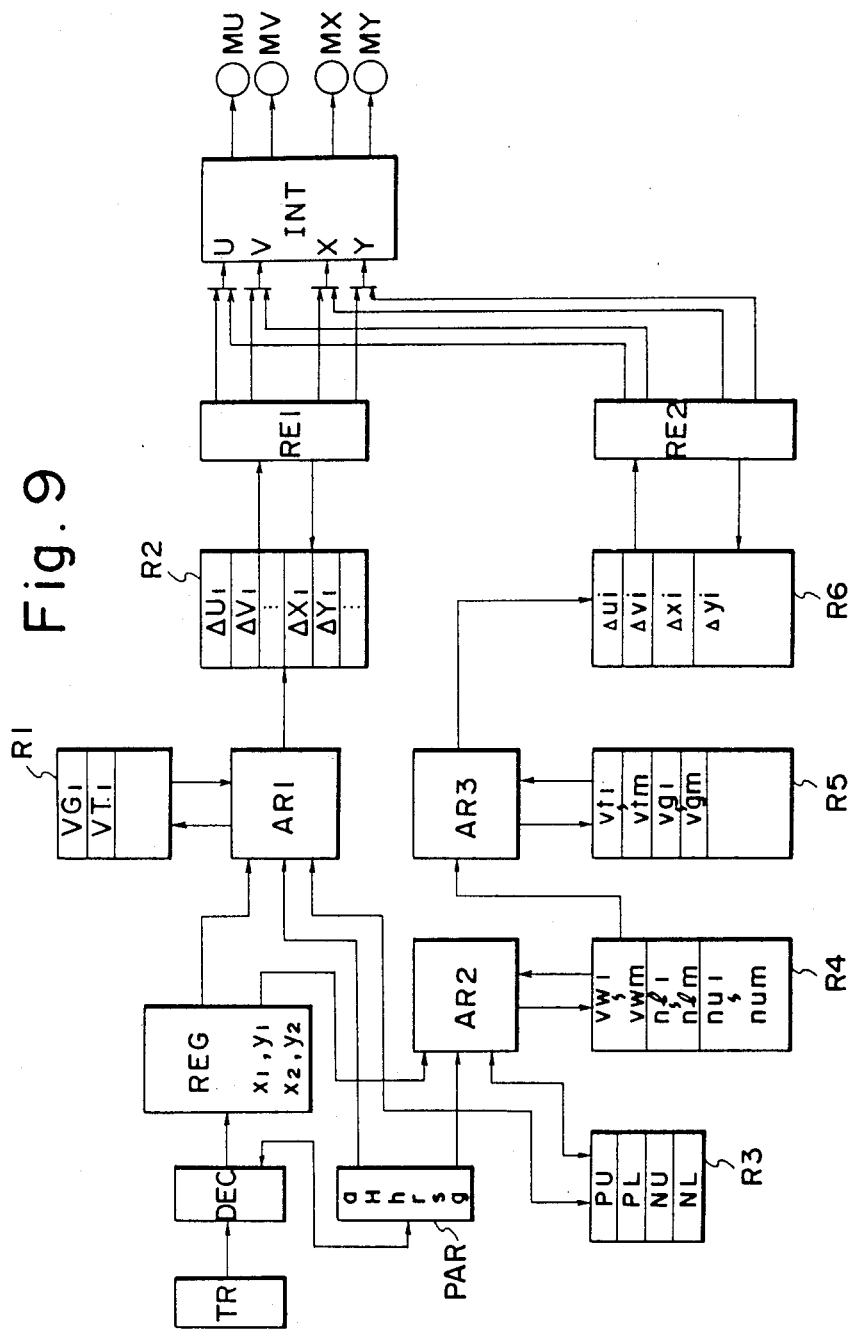
FIG. 9 is a block diagram showing the principal portions of a control apparatus.

FIG. 9 is a block diagram of a principal portion of a numerical control apparatus for practicing the taper cutting method of the present invention. TR denotes a tape reader, DEC a decoder, REG and $R_1$ through $R_6$ registers, $AR_1$ through $AR_3$ arithmetic circuits, PAR a parameter setting circuit, INT an interpolator, and MU, MV, MX, MY the motors indicated by like reference characters in FIG. 8. In this embodiment, the arithmetic circuit $AR_1$ is used for taper cutting along a straight line, as shown in FIG. 6, and the arithmetic circuits $AR_2$, $AR_3$ are used for taper cutting along a circular arc, as depicted in FIG. 7. However, this arrangement is for the purpose of simplifying the description; the arithmetic circuits can be replaced by a common arithmetic circuit and the registers $R_1$ through $R_6$ can be constituted by a single memory.

Described next will be an operation for taper cutting a frustoconical corner along the circular arcs QR, Q'R' shown in FIG. 7.

When a two-block command indicated by (4) above is read from a paper tape PTP by a tape reader, the command is decoded by the decoder DEC. This is followed by setting position data in the register REG as well as the radii r, s and workpiece thickness in the parameter setting circuit PAR. It is assumed here that the taper angle α, the distance H between the upper guide UG and lower guide DG, the distance H between the lower guide DG and the upper surface of the workpiece WK, etc., have already been set in the parameter setting circuit PAR. It is also assumed that the end point offset vector of the block has been stored in the register $R_3$ as end point offset vectors PU, PL of the first tapered surface $TP_1$.

In accordance with the sequence described above, the arithmetic circuit $AR_1$ finds the coordinates of points Q, Q', R, R', O, O', calculates the end point offset vector NL up to the lower guide by way of Eq. (6), calculates the end point offset vector NU up to the upper guide by way of Eq. (7), and sets NU, NL in the register $R_3$. Thereafter, the workpiece travelling distance vector $VT_1$ and upper guide travelling distance vector $VG_1$ are found on the basis of Eqs. (10), (11), and $VT_1$, $VG_1$ are set in the register $R_1$.

The arithmetic circuit $AR_1$ then finds the X- and Y-axis components $\Delta X_1$, $\Delta Y_1$, $\Delta U_1$, $\Delta V_1$ from the vectors $VT_1$, $VG_1$ set in the register $R_1$, and sets these in the register $R_2$. Thereafter, the data in the register $R_2$ are read out by a read circuit $RE_1$ and applied to the interpolator INT. The motors MX, MY, MU, MV are driven and controlled on the basis of pulses obtained by a linear interpolation, whereby taper cutting is executed along the straight line $\overline{AQ}$.

Next, in accordance with Eqs. (8), (9), the arithmetic circuit $AR_2$ finds the end point offset vectors NL, NU at the end point of the frustoconical contour (the starting point of the second tapered surface $TP_2$) and stores these in the offset register $R_3$. Note that the end point offset vectors of the first tapered surface $TP_1$ are the starting point offset vectors PL, PU at the frustoconical corner and are stored continuously in the register $R_3$.

Thereafter, the circular arcs QR, Q'R' are divided into m equal segments and the partitioning points $Q_{11}$, $Q_{21}$, $Q_{31}$... of the circular arc QR and the partitioning points $Q_{11}'$, $Q_{21}'$, $Q_{31}'$ ... of the circular arc Q'R' are found.

Next, vectors $nl_1$, $nl_2$, $nl_3$ are calculated by using Eqs. (12), (13), (14) . . . , $nu_1$, $nu_2$, $nu_3$ are found from Eqs. (12'), (13'), (14'), and vector $vw_i (= Q_{i-1,1}, Q_{1,1})$ (i=1, 2, 3 . . . ) found and set in the register $R_4$.

The workpiece travelling distance vector $VT_i$ and upper guide travelling distance vector $VG_i$ (i=1, 2, 3 . . . ) are then found from Eqs. (17), (18) and set in the register $R_5$.

The arithmetic circuit $AR_3$ successively reads the vectors $vt_i$, $vg_i$ set in the register $R_5$ and sets the X- and Y-axis components $\Delta x_1$, $\Delta y_1$, $\Delta u_i$, $\Delta v_i$ thereof in the register $R_6$.

Finally, the data in the register $R_6$ are read out successively by a read circuit $RE_2$ and applied to the interpolator INT. The motors MX, MY, MU, MV are driven and controlled on the basis of pulses obtained by a linear interpolation, whereby taper cutting is executed along the circular arc $\overline{QR}$. This ends the cutting of the frustoconical corner.

Taper cutting of the frustoconical corner shown n FIG. 7 is completed when the end point offset vector of the second tapered surface $TP_2$ is found and the second taperes surface $TP_2$ is taper-cut in the same fashion as the first tapered surface $TP_1$.

Though the upper surface of the workpiece serves as the programmed surface in the illustrated embodiment, the methodology is the same taking the lower surface of the workpiece or any desired height as the programmed surface.

In addition to being utilizable in a wire-cut electric discharge machine, as illustrated by the foregoing embodiment, the present invention can also be applied to a device such as a robot controlled by a numerical control apparatus.

What is claimed is:

1. A taper cutting method for a corner contour in which circular arcs are smoothly connected to respective wire paths on upper and lower workpiece surfaces of a first tapered surface, and in which there is a smooth connection from end points of the circular arcs to respective wire paths on the upper and lower workpiece surfaces of a second tapered surface, said method comprising:

entering radii r and s of said circular arcs on the upper and lower workpiece surfaces, respectively, together with path data specifying said wire paths of said first and second tapered surfaces;

calculating coordinates of points Q and r at which the ciruclar arc having the radius r contacts the path of the first and second tapered surfaces on the upper workpiece surface respectively, and of a center O of said circular arc of radius r;

calculating coordinates of points Q' and R' at which the circular arc having the radius s contacts the path of the first and second tapered surfaces on the lower workpiece surface, respectively, and of a center O' of said circular arc or radius;

calculating, through use of the coordinates of the points Q, R, Q' and R', end point offset vectors from one of the points Q and Q' on a programmed path of the first tapered surface to upper and lower guides of said wire, and starting point offset vectors from one of the points R and R' on a programmed path of the second tapered surface to said lower and upper guides; and through use of the offset vectors cutting a frustoconical corner by moving respective parts of the wire along the circular arc of radius r and the circular arc of radius s on the upper and lower workpiece surfaces, comprising:

dividing into m equal segments each of the two circular arcs of the upper and lower workpiece surfaces;

connecting the contact points Q and Q' at end points of the first tapered surface to the contact points R and R' at the starting points of the second tapered surface; and performing electric discharge machining based on a polygonal approximation between partitioning points to taper-cut the frustoconical corner.

2. The method of claim 1, comprising cutting said first and second tapered surfaces respectively before and after cutting said frustoconical surface, through use of said offset vectors.

3. The method of claim 2, comprising calculating a starting point offset vector for said first tapered surface and an end point offset vector for said second tapered surface, and using same for the respective cutting of said first and second tapered surfaces.

4. A taper cutting apparatus for a corner contour in which circular arcs are smoothly connected to respective wire paths on upper and lower workpiece surfaces of a first tapered surface, and in which there is a smooth connection fromend points of the circular arcs to respective wire paths on the upper and lower workpiece surfaces of a second tapered surface, said apparatus comprising:

means for entering radii r and s of said circular arcs on the upper and lower workpiece surfaces, respectively, togetther with path data specifying said wire paths of said first and second tapered surfaces;

means for calculating coordinates of points Q and R at which the circular arc having the radius r contacts the path of the first and second tapered surfaces on the upper workpiece surface respectively, and of a center O of said circular arc of radius r;

means for calculating coordinates of points Q', R' at which the circular arc having the radius s contacts the path of the first and second tapered surfaces on the lower workpiece surface, respectively, and of a center O' of said circular arc or radius;

means for calculating, through use of the coordinates of the points Q, R, Q' and R', end point offset vectors from one of the points Q and Q' on a programmed path of the first tapered surface to upper and lower guides of said wire, and starting point offset vectors from one of the points R and R' on a programmed path of the second tapered surface to said lower and upper guides; and means for, through the use of the offset vectors, cutting a frustoconical corner by moving respective parts of the wire along the circular arc of radius r and the circular arc of radius s on the upper and lower workpiece surfaces, said means for cutting comprising:

means for dividing into m equal segments each of the two circular arcs of the upper and lower workpiece surfaces;

means for connecting the contact points Q and Q' at end points of the first tapered surface to the contact points R and R' at the startng points of the second tapered surface; and means for performing electric discharge machining based on a polygonal approximation between partitioning points to taper-cut the frustoconical corner.

* * * * *

UNITED STATES PATENT AND TRADEMARK OFFICE
CERTIFICATE OF CORRECTION

PATENT NO. : 4,700,314

DATED : October 13, 1987

INVENTOR(S) : Kinoshita

It is certified that error appears in the above-identified patent and that said Letters Patent is hereby corrected as shown below:

[56] Foreign Patent Documents

3rd item "0066823" s/b --57-66823--;

Col. 1, line 11, "guied" s/b --guide--.

Col. 3, line 45, "indicated" s/b --indicates--.

Col. 6, line 7, "AB" s/b --$\overline{AB}$--;

Col. 6, line 53, "Q'R'" s/b --$\overline{Q'R'}$--;

Col. 6, line 58, "Q'R'" s/b --$\overline{Q'R'}$--;

Col. 6, line 60, "member" s/b --number--;

Col. 6, line 63, "Q'R'" s/b --$\overline{Q'R'}$--.

Col. 8, line 18, "ane lectrical" s/b --an electrical--.

Col. 9, line 48, "taperes" s/b --tapered--.

Col. 10, line 52, "fromend" s/b --from end--;

Col. 10, line 58, "togetther" s/b --together--.

Signed and Sealed this

Ninth Day of August, 1988

Attest:

DONALD J. QUIGG

Attesting Officer

Commissioner of Patents and Trademarks